(12) United States Patent
Sylvain

(10) Patent No.: US 7,443,834 B1
(45) Date of Patent: Oct. 28, 2008

(54) COMBINING MULTIMEDIA SERVICES WITH TRADITIONAL TELEPHONY

(75) Inventor: Dany D. Sylvain, Gatineau (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1210 days.

(21) Appl. No.: 10/028,510

(22) Filed: Dec. 20, 2001

(51) Int. Cl.
   *H04L 12/66* (2006.01)
(52) U.S. Cl. .................................. 370/352; 370/356
(58) Field of Classification Search .............. 370/351, 370/352, 353, 354, 355, 356, 395.5, 395.51, 370/395.52
   See application file for complete search history.

(56) References Cited

U.S. PATENT DOCUMENTS

| | | | |
|---|---|---|---|
| 5,454,032 A | 9/1995 | Pinard et al. ................. 379/167 |
| 5,539,884 A | 7/1996 | Robrock, II | |
| 5,604,737 A | 2/1997 | Iwami et al. ................. 370/352 |
| 5,689,553 A | 11/1997 | Ahuja et al. | |
| 5,764,750 A | 6/1998 | Chau et al. | |
| 5,790,798 A | 8/1998 | Beckett, II et al. ...... 395/200.54 |
| 5,809,128 A * | 9/1998 | McMullin .............. 379/215.01 |
| 5,884,032 A * | 3/1999 | Bateman et al. ............. 709/204 |
| 5,912,952 A | 6/1999 | Brendzel | |
| 5,946,386 A * | 8/1999 | Rogers et al. .......... 379/265.09 |
| 6,011,843 A | 1/2000 | Hochman et al. ........... 379/211 |
| 6,215,865 B1 | 4/2001 | McCalmont ................ 379/212 |
| 6,295,293 B1 * | 9/2001 | Tonnby et al. .............. 370/389 |
| 6,320,857 B1 * | 11/2001 | Tonnby et al. .............. 370/352 |
| 6,373,817 B1 | 4/2002 | Kung et al. | |
| 6,404,746 B1 | 6/2002 | Cave et al. | |
| 6,430,174 B1 | 8/2002 | Jennings et al. | |
| 6,442,268 B1 | 8/2002 | Klaghofer et al. | |
| 6,449,260 B1 | 9/2002 | Sassin et al. | |
| 6,459,787 B2 | 10/2002 | McIllwaine et al. ..... 379/265.06 |
| 6,515,996 B1 * | 2/2003 | Tonnby et al. .............. 370/401 |
| 6,539,077 B1 * | 3/2003 | Ranalli et al. .............. 379/67.1 |
| 6,594,254 B1 * | 7/2003 | Kelly ......................... 370/352 |
| 6,600,819 B1 | 7/2003 | Catley et al. ............. 379/205.1 |

(Continued)

FOREIGN PATENT DOCUMENTS

EP     0453128 A2     10/1991

(Continued)

OTHER PUBLICATIONS

Thom, Gary A., "H.323: The Multimedia Communications Standard for Local Area Networks," IEEE Communications Magazine, vol. 34, No. 12, Dec. 1996, pp. 52-56, XP 000636454.

(Continued)

*Primary Examiner*—Chi Pham
*Assistant Examiner*—Phuc Tran
(74) *Attorney, Agent, or Firm*—Withrow & Terranova, PLLC

(57) ABSTRACT

The present invention provides a combined user agent (CUA) to represent a telephone supported by a circuit-switched telephony switch and a packet-based media device as an integrated group to other network entities. The CUA is configured to facilitate the necessary call signaling to establish and control a voice call via the telephony switch, as well as the session control signaling necessary to establish and control a media session with the media device. Accordingly, the telephone and media device appear to the network devices as a single device having voice and media capabilities, wherein the voice capabilities are controlled in part by the telephony switch.

27 Claims, 7 Drawing Sheets

U.S. PATENT DOCUMENTS

| | | | |
|---|---|---|---|
| 6,625,141 B1 | 9/2003 | Glitho et al. | |
| 6,697,478 B1 | 2/2004 | Meldrum et al. | 379/211.04 |
| 6,754,693 B1 | 6/2004 | Roberts et al. | 709/205 |
| 6,768,722 B1 | 7/2004 | Katseff et al. | |
| 6,822,957 B1 * | 11/2004 | Schuster et al. | 370/389 |
| 6,981,022 B2 | 12/2005 | Boundy | |
| 7,218,722 B1 | 5/2007 | Turner et al. | |
| 2002/0075881 A1 | 6/2002 | Yoakum et al. | |
| 2002/0118675 A1 * | 8/2002 | Strathmeyer et al. | 370/352 |
| 2003/0063590 A1 | 4/2003 | Mohan et al. | |
| 2003/0214958 A1 | 11/2003 | Madour et al. | |
| 2004/0001501 A1 | 1/2004 | Delveaux et al. | |

FOREIGN PATENT DOCUMENTS

| | | |
|---|---|---|
| EP | 0 721 266 A2 | 10/1996 |
| EP | 0 999 712 A2 | 10/2000 |
| EP | 1 091 548 A2 | 4/2001 |
| EP | 1148688 A1 | 10/2001 |
| WO | WO 98/44703 | 10/1998 |
| WO | 01/15423 A1 | 3/2001 |
| WO | WO 01/69883 A2 | 9/2001 |
| WO | 02/11411 A1 | 2/2002 |

OTHER PUBLICATIONS

Anonymous: "H.245: Control Protocol for Multimedia Communication," Paragraph 5.2, May 1999, http://www.ihserc.com.

International Search Report and Written Opinion for PCT/IB02/04939 mailed Mar. 18, 2003.

International Search Report and Written Opinion for PCT/IB03/04263 mailed Feb. 16, 2004.

International Search Report and Written Opinion for PCT/IB03/04276 mailed Jan. 21, 2004.

International Search Report and Written Opinion for PCT/IB03/04269.

McGoogan, Judith R. et al., "Evolution of Switching Architecture to Support Voice Telephony over ATM," Apr.-Jun. 2000, Bell Labs Technical Journal, vol. 5, issue 2, pp. 157-168.

* cited by examiner

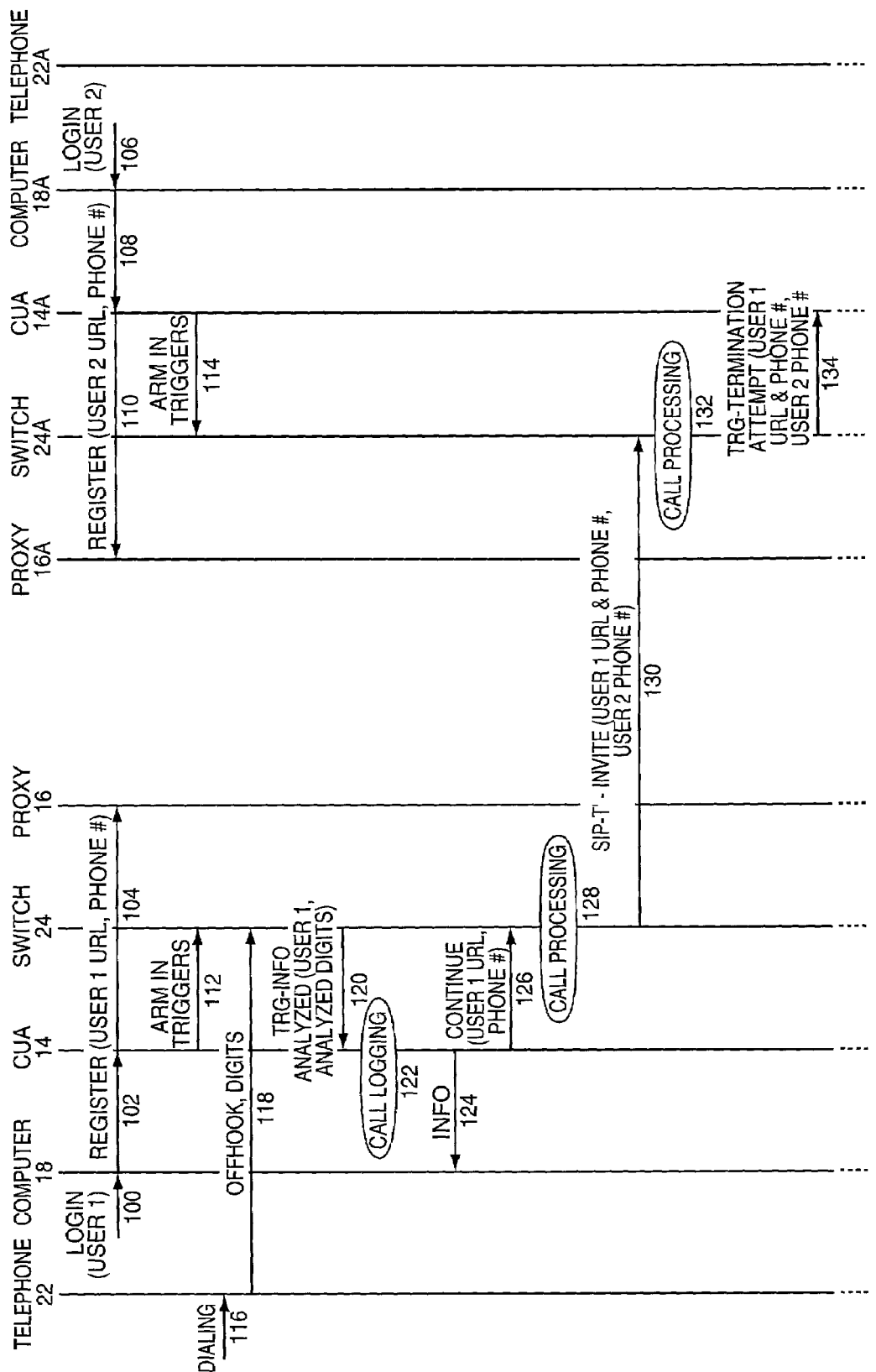

COMBINING MULTIMEDIA SERVICES WITH TRADITIONAL TELEPHONY

FIELD OF THE INVENTION

The present invention relates to facilitating multimedia services, and in particular, associating multimedia services with traditional telephony services in an efficient manner.

BACKGROUND OF THE INVENTION

Traditional telephony services provided by digital switches, such as digital multiplexing switches, have reached their functional limits with existing user interfaces, which essentially are telephone sets having limited displays and simple keypads. Further, the telephone sets have limited bandwidth. Over newer packet networks, multimedia services are flourishing and are capable of exploiting the capabilities of advanced user terminals, desktop computers, and network appliances.

Currently, the vast majority of voice telephony is provided, at least in part, by traditional circuit-switched networks. Given the extensive infrastructure, reliability, and quality of service, the traditional telephony systems are likely to remain a significant part of communications for the foreseeable future. Unfortunately, there has been difficulty integrating voice sessions over the traditional telephony network with multimedia sessions over packet networks. Users prefer the traditional telephony network for voice, yet the voice network is unacceptable for facilitating advanced multimedia services, such as screen sharing, video conferencing, and the like. Given the unique strengths of the respective communication systems, there is a need for an efficient and economical way to facilitate interworking between the networks. There is a further need to facilitate such interworking without requiring significant changes to the traditional telephony or packet-switched infrastructures and communication protocols.

SUMMARY OF THE INVENTION

The present invention provides a combined user agent (CUA) to represent a telephone supported by a circuit-switched telephony switch and a packet-based media device as an integrated group to other network entities. The CUA is configured to facilitate the necessary call signaling to establish and control a voice call via the telephony switch, as well as the session control signaling necessary to establish and control a media session with the media device. Accordingly, the telephone and media device appear to the network devices as a single device having voice and media capabilities, wherein the voice capabilities are controlled in part by the telephony switch.

Although the telephony switch uses circuit-switched communications, the telephone may be a circuit-switched telephone supported by the switch or may be a packet-based telephone, which is supported by a gateway supported the telephony switch. Further, the call signaling may take any form acceptable by the telephony switch to facilitate call processing and control. For example, the call signaling may conform to an intelligent network protocol and take place in part over an intelligent network primarily dedicated for call signaling.

In one embodiment, the session initiation protocol (SIP) is used to facilitate communications between the CUA and other SIP devices as well as the media devices represented by the CUA. Preferably, the voice call and media session are associated with one another using the CUA, and information about or related to the voice call and media session may be shared with applications participating in the voice call or media session. The applications may include video conferencing, audio streaming, video streaming, information streaming, voicemail, email, gaming, advertising, screen sharing, instant messaging, and the like.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

Figure 3:
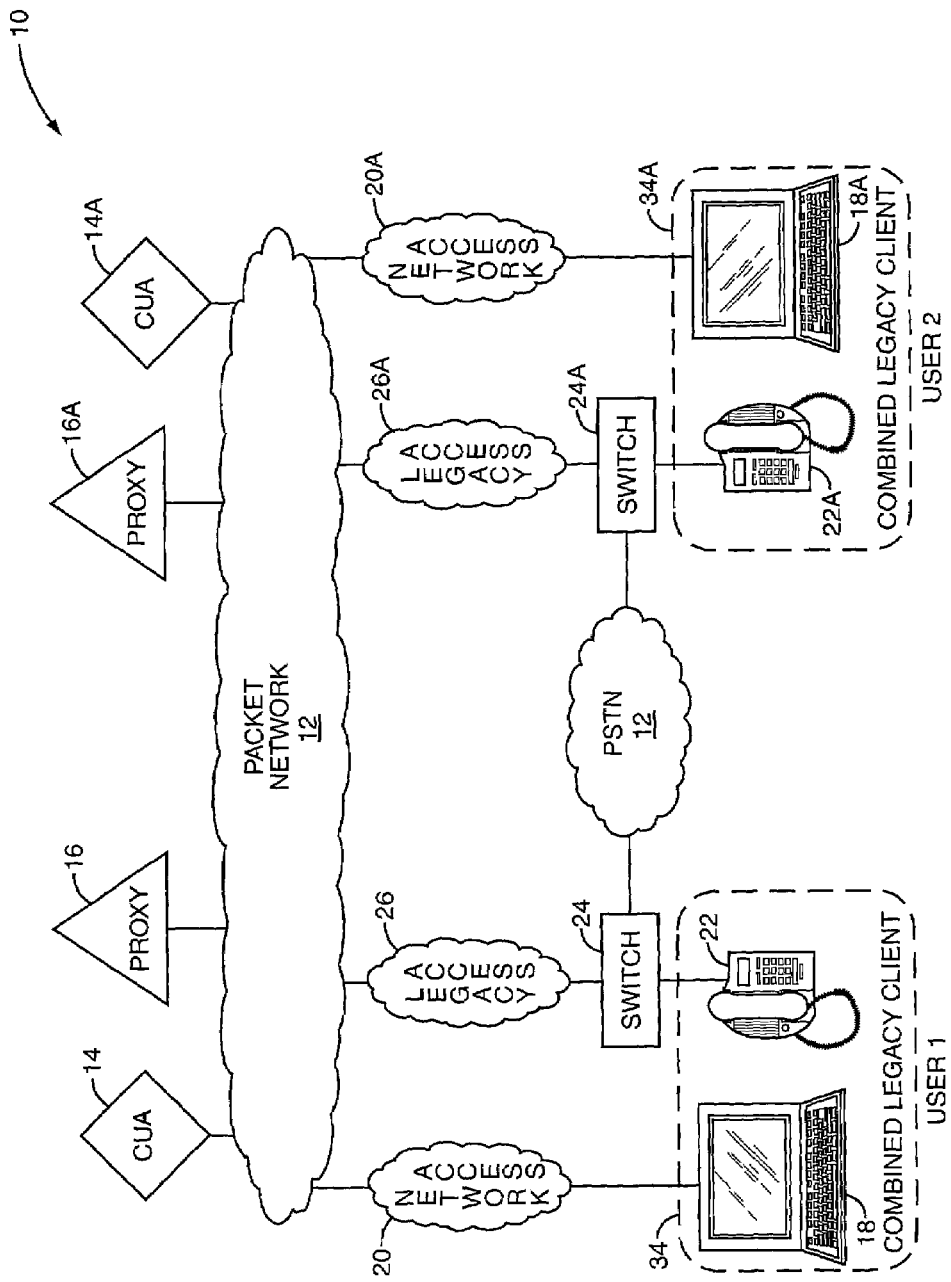
FIG. 3 is a communication environment according to a third embodiment of the present invention.
Figure 5B:
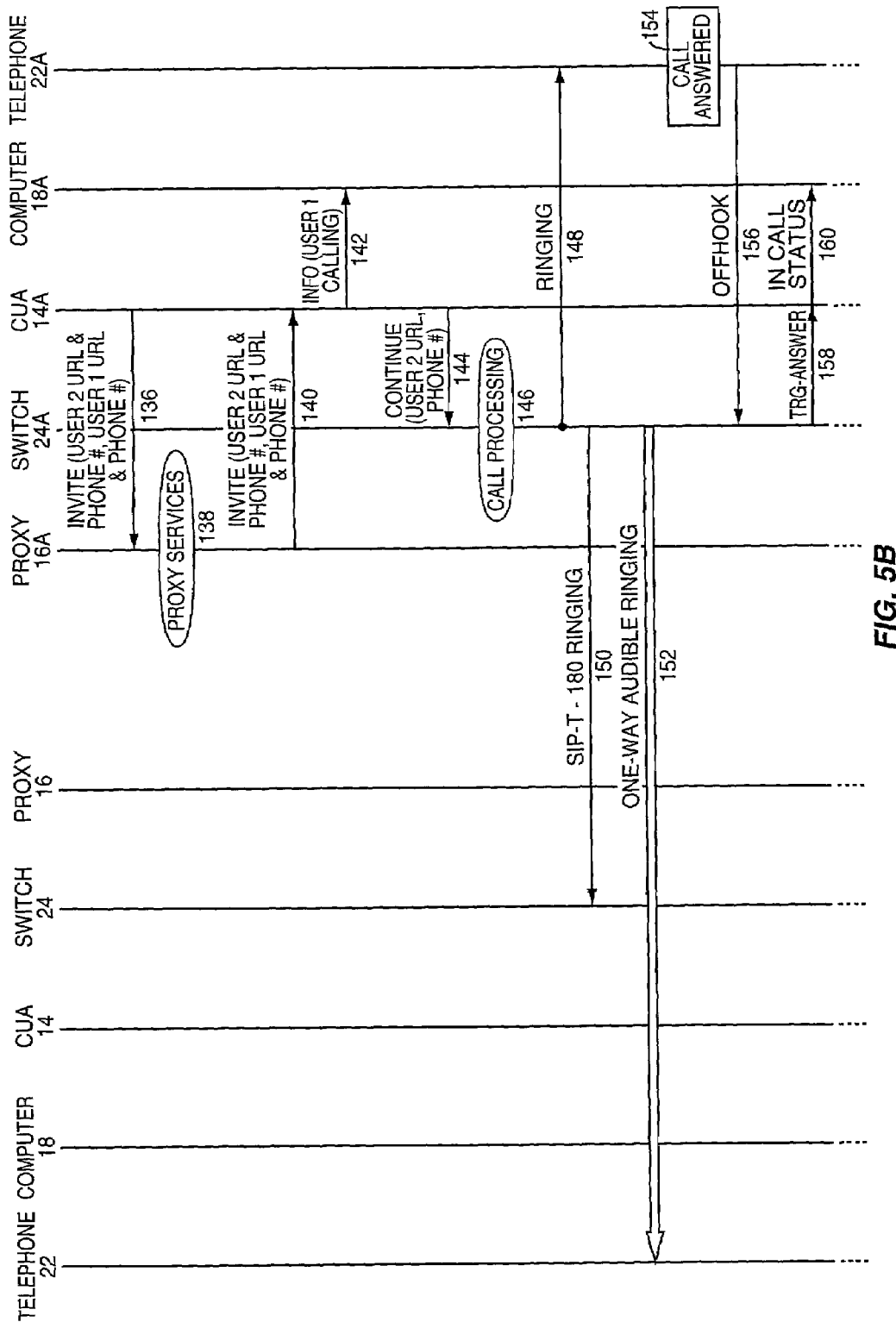
Figure 5C:
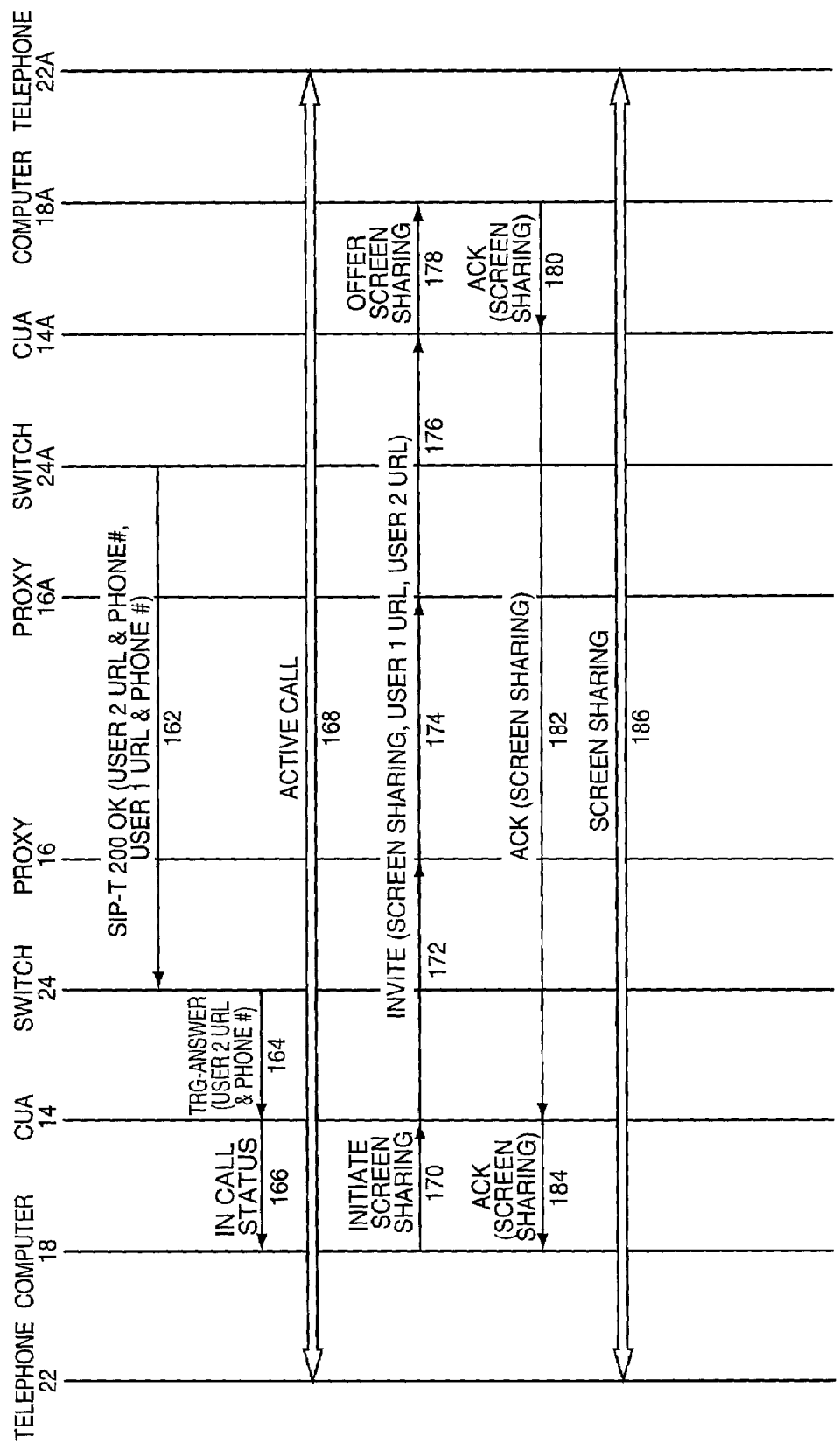

FIGS. 5A, 5B, and 5C are a communication flow diagram outlining an exemplary technique for associating a voice sharing and a screen sharing multimedia session in a communication environment as illustrated in FIG. 3.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention facilitates efficient unification of parallel voice and multimedia sessions, wherein the voice session takes place in part over a traditional circuit-switched telephony network. A call signaling agent is created to control packet-based multimedia sessions, as well as to control call signaling at a traditional telephony switch, for a telephone, and an associated multimedia device, such as a computer. The multi-functional call processing agent, typically referred to as a combined user agent (CUA), can effectively establish multimedia sessions with the multimedia device and voice calls with the telephone.

Figure 1:
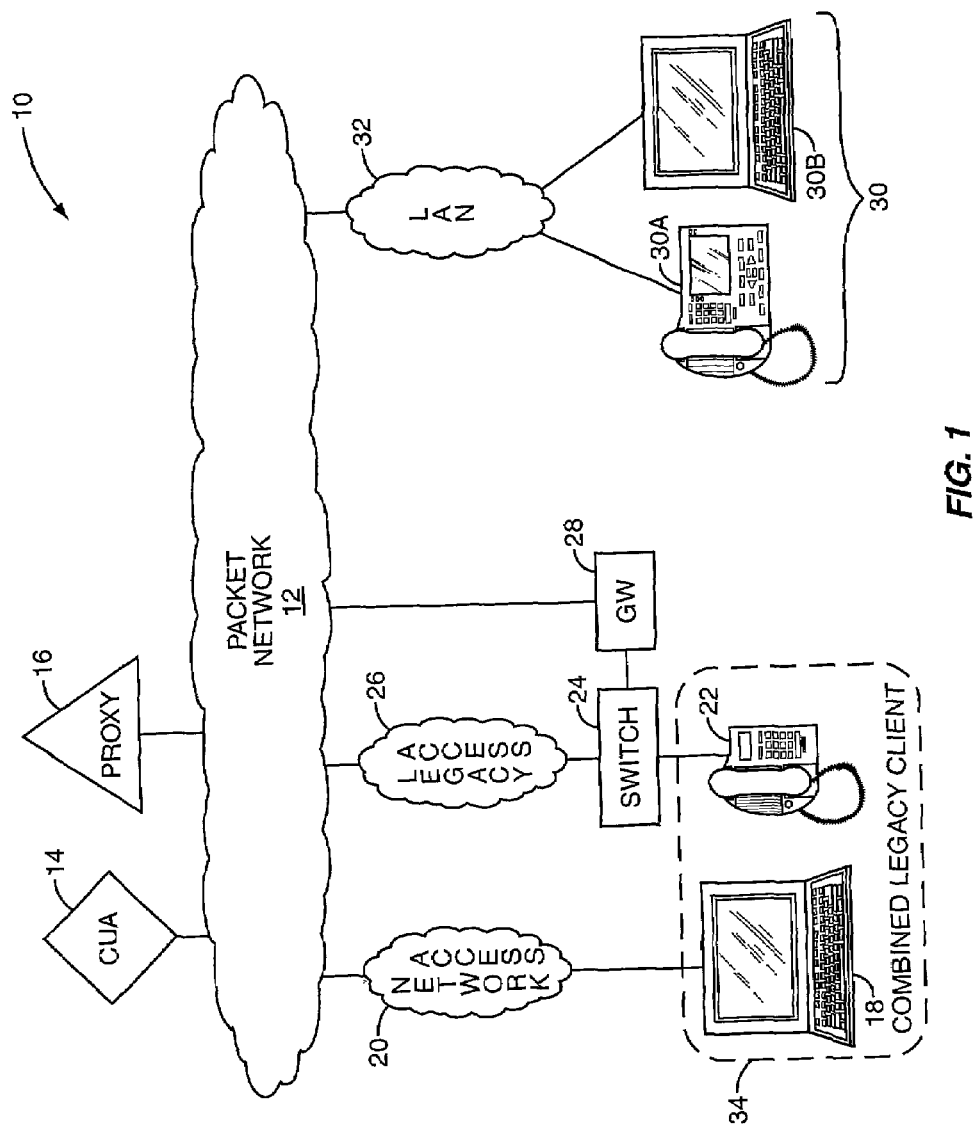
FIG. 1 is a communication environment according to a first embodiment of the present invention.

With reference to FIG. 1, a communication environment 10 according to one embodiment is illustrated. The communication environment 10 may include a packet network 12 including a CUA 14 and a supporting proxy 16. The CUA 14 acts as a virtual agent for a computing device, such as a computer 18, which is capable of supporting multimedia sessions. The computer 18 may connect to the packet network 12 via a network access 20, which may include a local area network (LAN), frame relay, digital subscriber line (DSL), cable, or the like.

The CUA 14 also acts as an agent for a traditional telephony device, such as a telephone 22, which is supported by a telephony switch 24 such as a digital multiple switch, public branch exchange (PBX), or the like, that is capable of providing circuit-switched communications between the telephone 22 and other telephony devices. To allow the CUA 14 to interact with and control the telephony switch 24, legacy access 26 is provided between the packet network 12 and the telephony switch 24. The legacy access 26 may be provided by existing intelligent networks (IN), including the advanced intelligent network (AIN), SIP-T capable networks, TAPI networks, and the like, that provide access to telephony switches 24 to facilitate call signaling. The CUA 14 is configured to establish multimedia sessions over network access 20 with the computer 18 as well as provide call signaling for the telephone 22 through the telephony switch 24 via the legacy access 26.

Although the concepts of the present invention are applicable to various communication environments and related protocols, the present invention is preferably implemented using the session initiation protocol, which is commonly referred to as SIP. The specification for SIP is provided in the Internet Engineering Task Force's Request for Comments (RFC) 2543: Session Initiation Protocol Internet Draft, which is incorporated herein by reference in its entirety. In general, SIP is used to establish media sessions between any number of endpoints. Typically, these endpoints may support any number or combination of data, audio, and voice media sessions, depending on the configuration of the device. A SIP endpoint is capable of running an application, typically referred to as a user agent (UA), which is capable of facilitating media sessions using SIP. In certain embodiment, user agents may register their ability to establish sessions with a SIP proxy by sending "REGISTER" messages to the SIP proxy. The REGISTER message informs the SIP proxy of the SIP universal resource locator (URL) that identifies the user agent to the SIP network. The REGISTER message also contains information about how to reach specific user agents over the SIP network, typically by providing the Internet Protocol (IP) address and port that the user agent will use for SIP sessions. When a user agent wants to establish a session with another user agent, the user agent initiating the session may send an INVITE message to the SIP proxy and specify the target user agent in the TO header of the INVITE message. Identification of the user agent takes the form of a SIP URL. The SIP proxy will use the SIP URL in the TO header of the message to determine if the targeted user agent is registered with the SIP proxy. Generally the user name is unique within the name space of the specified domain.

If the targeted user agent has registered with the SIP proxy, the SIP proxy will forward the INVITE message directly to the targeted user agent. The targeted user agent will respond with a 200 OK message, and a session between the respective user agents will be established as per the message exchange required in the SIP specification. Media capabilities are passed between the two user agents of the respective endpoints as parameters embedded within the session setup messages, such as the INVITE, 200 OK, and acknowledgement (ACK) messages. Media capabilities may be exchanged in other messages, such as the SIP "INFO" message. Media capabilities are typically described using the session description protocol (SDP). Once respective endpoints are in an active session with each other and have determined each other's capabilities, the specified media content may be exchanged during an appropriate media session.

According to the Internet Engineering Task Force's RFC 2543, a user agent is an application that contains both a user agent client and a user agent server. A user agent client generally refers to a client application that initiates SIP requests, wherein a user agent server is an application that contacts the user when a SIP request is received, and returns a response on behalf of the user. Typically, the response accepts, rejects, or redirects the received request.

The present invention provides for the CUA 14, which is an application, program, or function that acts on behalf of a multimedia client, provided by the computer 18 or like device, and a telephone 22. The computer 18 may have a SIP user agent, which is represented by the CUA 14. In essence, the CUA 14 will function to control call signaling to effect voice sessions between the telephone 22 and other devices via the telephony switch 24, and other multimedia sessions via the computer 18. Notably, the CUA 14 can effectively facilitate the integration and association of voice and other multimedia sessions provided by both devices. To devices needing to establish sessions with either the computer 18 or the telephone 22 in a SIP environment, the CUA 14 presents both devices as a single device having voice and other multimedia capabilities. The other devices need not know that the telephone 22 resides on a circuit-switched network.

In one embodiment, the CUA 14 will cooperate with the proxy 16, which is configured as a SIP proxy, in traditional fashion to establish multimedia sessions involving the computer 18. The sessions will be supported across the network access 20 in the packet network 12. With respect to voice communications via the telephone 22, the voice path may take various routes, remaining entirely within the public switched telephone network (PSTN), or venturing into the packet network 12 to communicate with a packet-switched telephony device or simply to bridge to another circuit-switched network.

The communication environment 10 illustrated in FIG. 1 illustrates voice communications between the telephone 22 and a voice-capable packet-switched device 30, such as an IP telephone 30A or a computer 30B. The packet-switched devices 30 are connected to the packet network 12 via a local area network 32 to support packet-switched communications. Since the telephone 22 and telephony switch 24 facilitate circuit-switched communications, a gateway (GW) 28 is integrated with the telephony switch 24 or provided as a separate device (as shown) to convert circuit-switched communications to packet-switched communications capable of being transported over the packet network 12 to the desired packet-switched device 30. The connection between the telephony switch 24 and the gateway 28 may be any traditional telephony line or trunk. The gateway 28 appears to the telephony switch 24 as another switching device supporting a variety of telephone numbers, which are associated with the packet-switched devices 30. Typically, the time-division multiplexed circuit-switched communications are converted into packets to facilitate voice communications over the Internet Protocol (VoIP). Importantly, although the voice session spans the circuit-switched and packet-switched networks, the CUA 14 represents the telephone 22 to the devices with which it communicates. In essence, the telephone 22 and the computer 18 form a combined legacy client 34, which is represented by the CUA 14.

Figure 2:
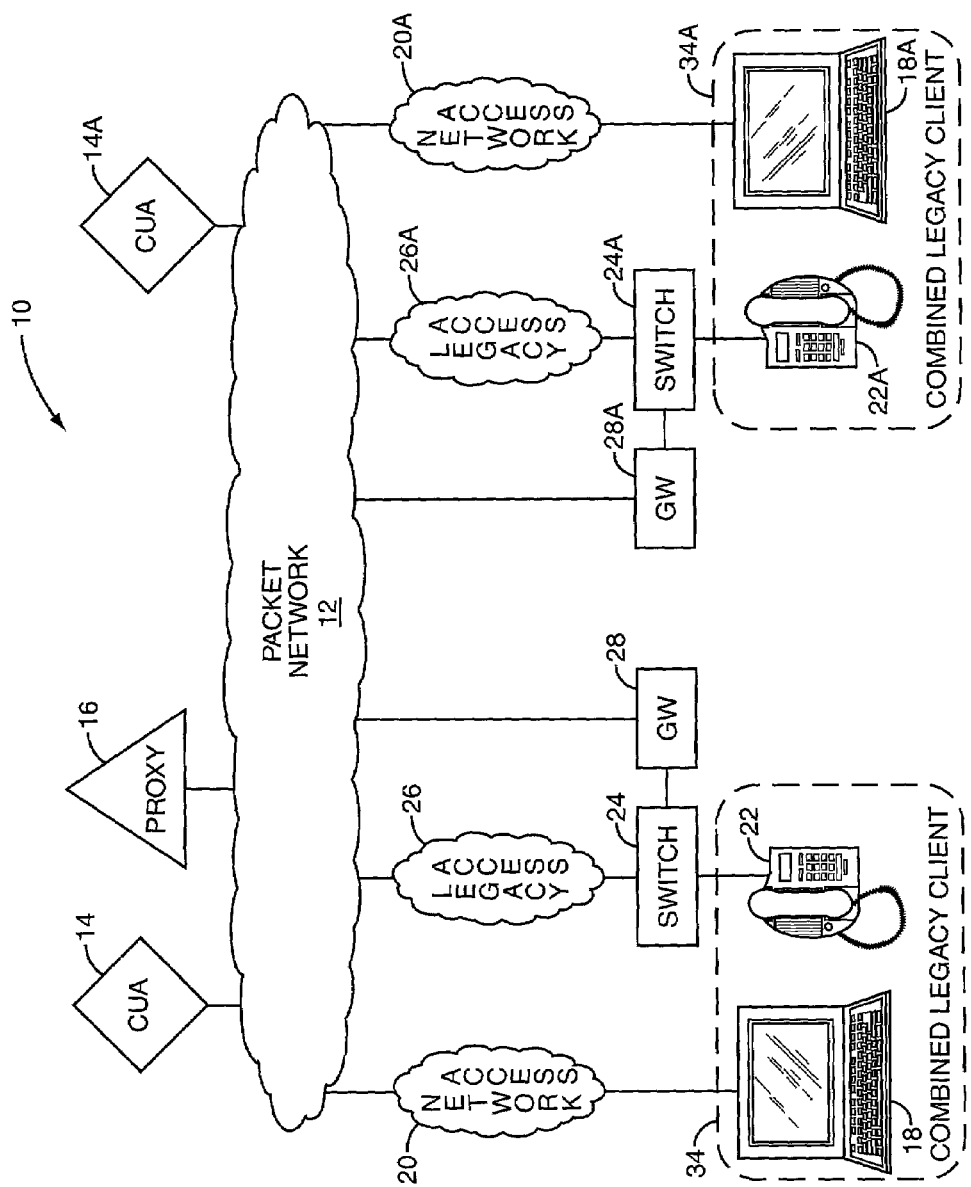
FIG. 2 is a communication environment according to a second embodiment of the present invention.

With reference to FIG. 2, another CUA 14A is provided to support a computer 18A via network access 20A and a circuit-switched telephone 22A, which is also supported by telephony switch 24A. The CUA 14A provides call signaling to the telephony switch 24A via legacy access 26A in a similar manner as that described above. Further, the telephony switch 24A is associated with a gateway 28A to convert circuit-switched communications into packet-switched communications for transport over the packet network 12. The communication environment 10 in FIG. 2 illustrates the circuit-switched communications between telephone 22 and telephone 22A during a voice session being routed over the packet network 12 between the gateways 28 and 28A. Multimedia sessions other than voice between computers 18 and 18A may be established in traditional fashion over the packet network 12. Again, the CUA 14 represents the combined legacy client 34 containing the computer 18 and telephone 22, whereas the CUA 14A supports the combined legacy client 34A, which is made up of the computer 18A and telephone 22A. In this embodiment, the CUA 14A is supported by the proxy 16.

With reference to FIG. 3, the CUA 14A may be supported by a separate proxy 16A. Further, the communications between the telephone 22 and telephone 22A during a voice session may be supported entirely within the PSTN 36. The CUAs 14 and 14A may provide call signaling not only to the respective telephony switches 24 and 24A, but to other network elements within the PSTN 36. In short, the CUAs 14 and 14A are configured to provide the necessary call signaling to establish voice sessions that are supported at least partially over the circuit-switched network of the PSTN 36, as well as multimedia sessions with the computer 18 over the packet network 12.

Figure 4:
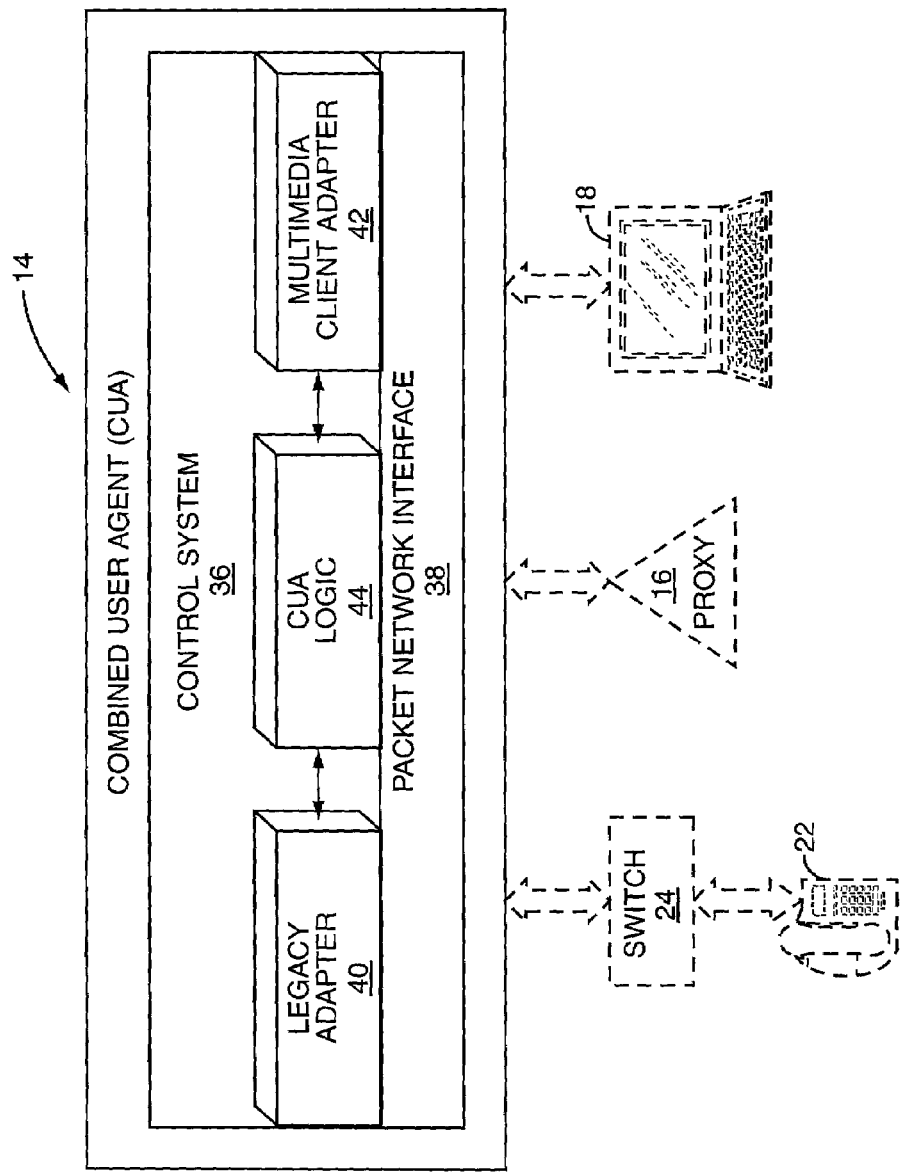
FIG. 4 is a block representation of a combined user agent according to one embodiment of the present invention.

As illustrated in FIG. 4, the combined user agent 14 is preferably implemented in a control system 36 associated with a packet network interface 38 for communicating over the packet network 12. The control system 36 will support software applications providing a legacy adapter 40, a multimedia client adapter 42, and the basic CUA logic 44. The legacy adapter 40 will provide the necessary protocol adaptation and call signaling control necessary to control the telephony switch 24 in light of SIP or related protocols for establishing media sessions. The multimedia client adapter 42 is used to support sessions with the associated computer 18 or like multimedia device. The multimedia client adapter 42 may provide protocol adaptation as necessary to establish the media sessions or a SIP implementation, wherein when the computer 18 emulates a SIP client, the CUA logic 44 will simply represent the multimedia capabilities of the computer 18 for the non-voice media sessions. The CUA logic 44 will also cooperate with the legacy adapter 40 to provide the necessary call signaling for the telephony switch 24 to control voice communications with the telephone 22. Accordingly, the CUA logic 44 cooperates with the legacy adapter 40 and the multimedia client adapter 42 to provide an interface to the computer 18 as well as an interface to the telephony switch 24, and an interface for communications with other devices, such as the proxy 16.

Turning now to FIGS. 5A-5C, an exemplary communication flow is shown for establishing a voice session and a screen sharing session between the telephones 22 and 22A and the computers 18 and 18A, respectively, in the communication environment 10 of FIG. 3. In a SIP environment, user 1 and user 2 will log in to their respective computers 18 and 18A, which will register with their respective proxies 16 and 16A. Accordingly, user I will log in to computer 18 (step 100), which will send a REGISTER message to CUA 14 with the URL for the computer 18 and the telephone number for the associated telephone 22 (step 102). The CUA 14 will provide this information to the supporting proxy 16 in a REGISTER message (step 104). Likewise, user 2 will log in to computer 18A (step 106), which will provide the URL for computer 18A and the telephone number for the associated telephone 22A to the CUA 14A (step 108), which will send another REGISTER request to the associated proxy 16A (step 110).

The CUA 14 will then arm the intelligent network triggers by sending an appropriate message to the telephony switch 24 (step 112). The CUA 14A will also arm the intelligent network triggers of telephony switch 24A (step 114). At this point, the combined legacy clients 34 and 34A are properly registered and ready for initiating voice and other multimedia sessions.

Assume that the session is initiated by user 1 dialing the telephone number of telephone 22A (step 116). Accordingly, the telephone 22 will alert the telephony switch 24 of an off-hook status and report the digits dialed (step 118). In this embodiment, messages between the telephones 22 and 22A and the telephony switches 24 and 24A are transported in traditional PSTN fashion. The telephony switch 24 will start processing the call as usual and will reach a point where it will encounter the IN trigger set in step 112. The telephony switch 24 will respond by sending an information-analyzed message to the CUA 14 indicating that user 1 is dialing the number of telephone 22A (step 120). The CUA 14 will log the call (step 122) and send an INFO message to the computer 18 indicating that the call is proceeding (step 124). The computer 18 may use this information to retrieve relevant information like appointments, emails, documents, etc. which may be associated to the user associated with the telephone number of telephone 22A. The CUA 14 will next send a CONTINUE message to the telephony switch 24 providing the URL and phone number for user 1 (step 126). Upon receiving the CONTINUE message, the telephony switch 24 will continue call processing (step 128) until it reaches the point where it determines that the call needs to proceed via switch 24A. To do so, switch 24 will send a SIP trunking (SIP-T') INVITE message to telephony switch 24A (step 130). The INVITE message will include the URL and telephone number for user 1 as well as the dialed number corresponding to telephone 22A (user 2). In return, the telephony switch 24A will provide call processing (step 132) and eventually encounter the intelligent network trigger that was armed in step 114. This will cause the telephony switch 24A to send a message indicating an attempt to terminate a call for telephone 22A to CUA 14A (step 134). The message received by the CUA 14A will include the URL and telephone number for user 1 and the telephone number for telephone 22A.

The CUA 14A will perform a lookup using the telephone number for telephone 22A, add the corresponding URL for the computer 18A and forward an INVITE message including the URLs and telephone numbers for both user 1 and user 2 to the proxy 16A (step 136). The proxy 16A will provide any necessary services (step 138), such as call screening, and, assuming that the call can proceed to telephone 22A, will respond with an INVITE message back to CUA 14A (step 140), which will trigger the CUA 14A to send an INFO message indicating that user 1 is calling user 2 on telephone 22A to the computer 18A for reference (step 142). Further, the CUA 14A will send a CONTINUE message identifying the URL and telephone number for user 2 to the telephony switch 24A (step 144). The telephony switch 24A will provide further call processing (step 146) and apply ringing to the telephone 22A of user 2 (step 148). The telephony switch 24A will also send a SIP-T 180 RINGING message to telephony switch 24 to alert the telephony switch 24 that telephone 22A is being rung (step 150). The telephony switch 24 will enable the voice path toward telephone 22 of user 1, which will result in a one-way voice path and the audible ringing sent by switch 24A to be heard at telephone 22 (step 152).

At some point, user 2 will answer their call (step 154), which will prompt the telephone 22A to indicate an OFF-HOOK condition, which is detected by the telephony switch 24A (step 156). In response, the telephony switch 24A will perform additional call processing and will encounter another intelligent network trigger armed in step 114. This trigger will cause telephony switch 24A to send an ANSWER message to the CUA 14A (step 158), which will send a message to computer 18A that a call is in progress (step 160). Further, the telephony switch 24A will send a SIP-T 200 OK message including the URLs and telephone numbers for both users 1 and 2 to telephony switch 24 (step 162), which will enable a two-way voice path. The telephony switch 24 will also perform additional call processing and will encounter another intelligent network trigger armed in step 112. The telephony switch 24 will send an ANSWER message including the URL and telephone number of user 2 to the CUA 14 (step 164), which will send a message to computer 18 that a call is in progress (step 166). At this point, a call is established between telephone 22 and telephone 22A (step 168).

Once the voice session is established between the telephones 22 and 22A, a screen sharing application is initiated by user 1 at computer 18. Accordingly, computer 18 will send a message to the CUA 14 indicating that it wants to initiate screen sharing (step 170). The CUA 14 will send a SIP INVITE message to the supporting proxy 16 indicating that a screen sharing session is desired between computers 18 and 18A having the URLs associated with both users (step 172). The proxy 16 will forward the INVITE message to the SIP proxy 16A (step 174), which will further forward the INVITE message to the CUA 14A (step 176). The CUA 14A will send a message offering screen sharing to computer 18A (step 178). Computer 18A, assuming that screen sharing is accepted, will send an acknowledgement (ACK) of the screen sharing to the CUA 14A (step 180), which will forward a similar ACK message to CUA 14 (step 182), which will further forward the ACK message to computer 18 (step 184). Upon completion of the ACK messages, a screen sharing session is established between computer 18 and computer 18A (step 186).

As seen from the above, the CUA 14 operates on behalf of the supported telephone 22 and computer 18 to facilitate media sessions as a packet-switched entity. For voice sessions, the CUA 14 effectively controls call signaling for the supporting telephony switch 24 to facilitate voice sessions without knowledge by other network devices.

Although a screen sharing session is illustrated, those skilled in the art will recognize that concepts of the present invention are equally applicable to video conferencing, audio streaming, video streaming, information streaming, voicemail, email, gaming, advertising, instant messaging, or any other desired multimedia session that may benefit by having an affiliated voice session. Further, although circuit-switched telephones, such as telephone 22A, are disclosed and described, the telephony switch 24 may support devices that further support packet-switched telephones. The invention is equally applicable and beneficial to such configurations, where a voice session or like media session must be carried out at least in part through a telephony switching device. In operation, the CUA 14 is preferably configured to interact with the computer 18 to enhance the functionality and usefulness of applications supporting the voice and multimedia sessions. For example, the CUA 14 can provide information to applications on the computer 18 indicating that a voice session is in progress, and also provide information about the voice session, such as with whom the voice session is occurring and any associated information, such as a telephone number of a participating device or user. These features are particularly useful for conference calls, where presentations must be shared and it is beneficial to identify the participating parties.

Those skilled in the art will recognize improvements and modifications to the preferred embodiments of the present invention. For example, the switch 24 may be a wireless switch supporting wireless communication via a base station with a mobile terminal, such as a mobile telephone, personal digital assistant (PDA), or the like. Accordingly, the voice connection for the voice session may be established over a wireless link. All such improvements and modifications are considered within the scope of the concepts disclosed herein and the claims that follow.

What is claimed is:

1. A system comprising:
   a) an interface adapted to facilitate media communications; and
   b) a control system associated with the interface and providing a combined user agent, which is adapted to:
      i) represent a telephone and a computing device as a single multimedia device capable of supporting voice and media sessions;
      ii) communicate with a circuit-switched telephony switch to establish a connection with the telephone through the circuit-switched telephony switch to facilitate a voice session with another voice-capable device; and
      iii) communicate with the computing device to establish a media session between the computing device and another media-capable device,
   wherein the combined user agent appears to network devices as a multimedia client supporting voice and media sessions and interacts with the circuit-switched telephony switch as well as the computing device to facilitate the voice and media sessions.

2. The system of claim 1 wherein the combined user agent is further adapted to associate the connection and media session with one another.

3. The system of claim 1 wherein the combined user agent is further adapted to provide information associated with the connection to the computing device for use in an application associated with the media session.

4. The system of claim 1 wherein the combined user agent is further adapted to communicate with the circuit-switched telephony switch using call signaling messages required to establish and control the connection between the telephone and the voice-capable device.

5. The system of claim 4 wherein the combined user agent is further adapted to communicate with the circuit-switched telephony switch using a first protocol.

6. The system of claim 5 wherein the combined user agent is further adapted to communicate with the computing device with signaling messages required to establish and control a media session between the computing device and the media-capable device using a second protocol.

7. The system of claim 1 wherein the combined user agent is further adapted to use the session initiation protocol, SIP, when representing the multimedia device to other SIP devices.

8. The system of claim 7 wherein the combined user agent is further adapted to use the session initiation protocol when communicating with the computing device to establish the media session between the computing device and another media-capable device.

9. The system of claim 1 wherein the media session established between the computing device and another media capable device is at least one of the group consisting of video session, screen sharing session, audio streaming, video streaming, information streaming, voicemail, email, gaming, advertising, and instant messaging session.

10. A method facilitating voice and media sessions comprising:
   a) representing a telephone and a computing device as a combined user agent capable of supporting voice and media sessions;
   b) communicating with a circuit-switched telephony switch to establish a connection with the telephone through the circuit-switched telephony switch to facilitate a voice session with another voice-capable device; and
   c) communicating with a computing device to establish a media session between the computing device and another media-capable device,
   wherein the combined user agent appears to network devices as a multimedia client supporting voice and media sessions and interacts with the circuit-switched telephony switch as well as the computing device to facilitate the voice and media sessions.

11. The method of claim 10 further comprising associating the connection and media session with one another.

12. The method of claim 10 further comprising providing information associated with the connection to the computing device for use in an application associated with the media session.

13. The method of claim 10 further comprising communicating with the circuit-switched telephony switch using call signaling messages required to establish and control the connection between the telephone and the voice-capable device.

14. The method of claim 13 further comprising communicating with the circuit-switched telephony switch using a first protocol.

15. The method of claim 14 further comprising communicating with the computing device with signaling messages required to establish and control a media session between the computing device and the media-capable device using a second protocol.

16. The method of claim 10 further comprising communicating using the session initiation protocol, SIP, when representing the multimedia device to other SIP devices.

17. The method of claim 16 further comprising communicating using the session initiation protocol when communicating with the computing device to establish the media session between the computing device and another media-capable device.

18. The method of claim 10 wherein the media session established between the computing device and another media-capable device is at least one of the group consisting of video session, screen sharing session, audio streaming, video streaming, information streaming, voicemail, email, gaming, advertising, and instant messaging session.

19. A computer readable medium having software for implementing a combined user agent and comprising computer instructions to:
   a) represent a telephone and a computing device as a single multimedia device capable of supporting voice and media sessions;
   b) communicate with a circuit-switched telephony switch to establish a connection with the telephone through the circuit-switched telephony switch to facilitate a voice session with another voice-capable device; and
   c) communicate with a computing device to establish a media session between the computing device and another media-capable device,
   wherein the combined user agent appears to network devices as a multimedia client supporting voice and media sessions and interacts with the circuit-switched telephony switch as well as the computing device to facilitate the voice and media sessions.

20. The computer readable medium of claim 19 wherein the instructions are further adapted to associate the connection and media session with one another.

21. The computer readable medium of claim 19 wherein the instructions are further adapted to provide information associated with the connection to the computing device for use in an application associated with the media session.

22. The computer readable medium of claim 19 wherein the instructions are further adapted to communicate with the circuit-switched telephony switch using call signaling messages required to establish and control the connection between the telephone and the voice-capable device.

23. The computer readable medium of claim 22 wherein the instructions are further adapted to communicate with the circuit-switched telephony switch using a first protocol.

24. The computer readable medium of claim 23 wherein the instructions are further adapted to communicate with the computing device with signaling messages required to establish and control a media session between the computing device and the media-capable device using a second protocol.

25. The computer readable medium of claim 19 wherein the instructions are further adapted to use the session initiation protocol, SIP, when representing the multimedia device to other SIP devices.

26. The computer readable medium of claim 25 wherein the instructions are further adapted to use the session initiation protocol when communicating with the computing device to establish the media session between the computing device and another media capable device.

27. The computer readable medium of claim 19 wherein the media session established between the computing device and another media capable device is at least one of the group consisting of video session, screen sharing session, audio streaming, video streaming, information streaming, voicemail, email, gaming, advertising, and instant messaging session.

* * * * *